(12) United States Patent
Shibayama

(10) Patent No.: US 8,576,967 B2
(45) Date of Patent: Nov. 5, 2013

(54) SEMICONDUCTOR DEVICE AND COMMUNICATION METHOD

(75) Inventor: Atsufumi Shibayama, Tokyo (JP)

(73) Assignee: NEC Corporation, Tokyo (JP)

( * ) Notice: Subject to any disclaimer, the term of this patent is extended or adjusted under 35 U.S.C. 154(b) by 391 days.

(21) Appl. No.: 12/737,195

(22) PCT Filed: Apr. 14, 2009

(86) PCT No.: PCT/JP2009/057493
§ 371 (c)(1),
(2), (4) Date: Dec. 17, 2010

(87) PCT Pub. No.: WO2010/010745
PCT Pub. Date: Jan. 28, 2010

(65) Prior Publication Data
US 2011/0089981 A1     Apr. 21, 2011

(30) Foreign Application Priority Data

Jul. 23, 2008   (JP) .................................. 2008-190081

(51) Int. Cl.
*H04L 7/00* (2006.01)
(52) U.S. Cl.
USPC ........... 375/354; 375/316; 375/362; 375/371; 375/375; 375/376; 327/115; 327/117; 327/145
(58) Field of Classification Search
USPC ......... 375/224, 259, 316, 326, 354, 362, 371, 375/373, 375, 376; 327/115–117, 145
See application file for complete search history.

(56) References Cited

U.S. PATENT DOCUMENTS

| 5,754,833 A | 5/1998 | Singh et al. |
| 7,036,038 B2 * | 4/2006 | Urzi et al. ..................... 713/401 |

(Continued)

FOREIGN PATENT DOCUMENTS

| JP | 6-45880 A | | 2/1994 |
| JP | 2003-273847 A | | 9/2003 |
| WO | WO 2006/030904 | * | 3/2006 |
| WO | WO 2006/030904 A1 | | 3/2006 |

*Primary Examiner* — Hirdepal Singh
(74) *Attorney, Agent, or Firm* — McGinn IP Law Group, PLLC

(57) ABSTRACT

It is possible to provide a highly reliable semiconductor device and a communication method in which communication can be performed between circuits with a large degree of freedom of clock frequency which can be set in each of the circuits, a decisive operation, and a small communication latency. The semiconductor device according to the present invention includes a first circuit that performs processing based on a first clock signal, the first clock signal having a frequency M/N times as large as a frequency of a second clock signal (N is a positive integer, and M is a positive integer larger than N); a second circuit that performs processing based on the second clock signal; and a communication timing control circuit that generates a communication timing signal to control a timing at which the first circuit performs communication with the second circuit. The communication timing control circuit generates the communication timing signal determined by a frequency ratio information and a phase relation information, the frequency ratio information setting a frequency ratio of the first clock signal to the second clock signal, the phase relation information indicating a phase relation between the first clock signal and the second clock signal.

12 Claims, 11 Drawing Sheets

(56) References Cited

U.S. PATENT DOCUMENTS

| | | |
|---|---|---|
| 7,560,962 B2 * | 7/2009 | Kamath .................. 327/158 |
| 7,635,999 B1 * | 12/2009 | Jamal ..................... 327/117 |
| 7,656,234 B2 * | 2/2010 | Satoh ..................... 331/1 A |
| 7,702,945 B2 | 4/2010 | Shibayama et al. |
| 7,882,474 B2 * | 2/2011 | Wahl et al. .............. 716/101 |
| 8,051,320 B2 * | 11/2011 | Knoth ..................... 713/503 |
| 8,072,253 B2 * | 12/2011 | Kaeriyama et al. ...... 327/231 |
| 8,160,117 B1 * | 4/2012 | Courcy ................... 375/130 |
| 8,422,619 B2 * | 4/2013 | Shibayama .............. 377/48 |
| 2008/0218225 A1 * | 9/2008 | Shibayama et al. ...... 327/144 |

* cited by examiner

SEMICONDUCTOR DEVICE AND COMMUNICATION METHOD

TECHNICAL FIELD

The present invention relates to a semiconductor device and a communication method, and more particularly, to a communication technique between a plurality of circuits operating with different clock frequencies.

BACKGROUND ART

A communication system between a plurality of circuits or functional blocks operating with different clock frequencies mainly includes a synchronous system and an asynchronous system. The synchronous system can be applied when a frequency ratio of each clock of two circuits that communicate with each other is one to an integer (e.g., 1:2, 1:3, . . . etc) or an integer to one (e.g., 2:1, 3:1, . . . etc), and phases of the two clocks are equal to each other. In short, the synchronous communication on the basis of the synchronous system is the communication method that can be performed only between the circuits having clocks synchronized with each other.

FIG. 10 shows an example of a semiconductor device in which a circuit A operating with a clock A and a circuit B operating with a clock B communicate with each other using the synchronous system. In this example, the circuit A and the circuit B communicate data from the circuit A to the circuit B using a communication request signal Req, a communication response signal Ack, and a communication data signal Data.

The frequency of the clock A is an integral multiple (e.g., once, twice, three times, . . . etc) of the clock B. The distribution delay of the clock A and that of the clock B are designed to be made equal by a method such as a clock tree synthesis. Further, the timings of the clock A and the clock B are designed so as to satisfy the set up and hold time constraints by adjacent communication timings.

The communication request signal Req is a signal output by the circuit A at the timing of the clock A and received by the circuit B at the timing of the clock B when there is a communication request from the circuit A to the circuit B. The communication response signal Ack is a signal output by the circuit B at the timing of the clock B and received by the circuit A at the timing of the clock A when the circuit B is in a reception possible state or the circuit B normally receives communication data output from the circuit A. The communication data signal Data is a signal that transmits the communication data from the circuit A to the circuit B.

A counter circuit 100 refers to a frequency ratio information 101 indicating a frequency ratio of the clock A to the clock B, and generates a communication timing signal 102 indicating the timing at which the circuit A communicates. The circuit A receives the communication timing signal 102 and makes the communication speed coincide with the reception speed of the circuit B, so as to achieve synchronous communication.

FIG. 11 is a timing chart showing an operation in a case in which the frequency of the clock A is twice as large as that of the clock B, and data is transmitted from the circuit A to the circuit B. This timing chart shows the clock A, the communication timing signal 102, the communication request signal Req, the communication data signal Data, the clock B, and the communication response signal Ack. In FIG. 11, the timings of rising edges of the clock A are indicated by symbols T0, T1, T2, . . . .

Since the frequency of the clock A is twice as large as the frequency of the clock B, the phases (rising edges) of the clock A and the clock B match once for two cycles of the clock A, specifically, at timings T0, T2, T4, T6, T8. The circuit A refers to the communication timing signal 102 that indicates the timing at which the phases of the clock A and the clock B match to perform communication operation only at a timing at which the phases of the clock A and the clock B match. On the other hand, the circuit B performs the communication operation for each cycle of the clock B. Thus, the communication speed of the circuit A coincides with that of the circuit B.

More specifically, the communication timing signal 102 has the value 1 at a timing at which the phases of the clock A and the clock B match and communication is performed. Flip-flops A1, A2, and A3 included in the circuit A each have an enable input (EN) that receives the communication timing signal 102, so as to operate only at a timing at which the communication timing signal 102 has the value 1. Hence, the circuit A outputs the communication request signal Req and the communication data signal Data and receives the communication response signal Ack at a timing at which this communication is performed.

When the frequency of the clock A is an integral multiple of the clock B, the communication timing signal 102 can be easily generated by the counter circuit 100. For example, when the frequency of the clock A is N times as large as the clock B (N is an integer), the value 1 may be output as the communication timing signal 102 once for N cycles using a count circuit that counts up from 1 to N.

Next, a specific communication operation will be described with reference to FIG. 11. First, at timing T0, the circuit A outputs the value 0 as the communication request signal Req, so as to notify the circuit B that there is no communication request. On the other hand, the circuit B outputs the value 1 as the communication response signal Ack, so as to notify the circuit A that the circuit B is ready to perform communication with the circuit A. Further, the circuit B receives the value 0 output by the circuit A as the communication request signal Req at timing T0, and judges that there is no communication request from the circuit A.

Next, at timing T2, the circuit A outputs the value 1 as the communication request signal Req so as to notify the circuit B that there is a communication request, and outputs data to be transmitted D0 as the communication data signal Data. The circuit B outputs the value 1 as the communication response signal Ack also at timing T2 subsequent to timing T0.

Next, at timing T4, the circuit A receives the value 1 output by the circuit B as the communication response signal Ack at timing T2, and judges that the communication request and the data D0 are received. As a result, the circuit A outputs the value 0 as the communication request signal Req, and notifies the circuit B that there is no further communication request. At timing T4, the circuit B receives the communication request output by the circuit A as the communication request signal Req at timing T2, and receives the communication data D0. As a result, the circuit B outputs the value 0 as the communication response signal Ack, and notifies the circuit A that the circuit B cannot receive further communication.

Next, at timing T6, the circuit A again outputs the value 1 to the communication request signal Req so as to notify the circuit B that there is a communication request, and outputs data to be transmitted D1 as the communication data signal Data. The circuit B again outputs the value 1 to the communication response signal Ack, so as to notify the circuit A that the circuit B is ready to receive communication.

Next, at timing T8, the circuit A receives the value 1 output by the circuit B as the communication response signal Ack at timing T6, and judges that the communication request and the data D1 are received by the circuit B. As a result, the circuit A outputs the value 0 as the communication request signal Req, and notifies the circuit B that there is no further communication request. The circuit B receives the communication request output by the circuit A as the communication request signal Req at timing T6, and receives the communication data D1. As a result, the circuit B outputs the value 0 as the communication response signal Ack, and notifies the circuit A that the circuit B cannot receive further communication.

As described above, a handshake-type synchronous communication system in which the transmission-side circuit A and the reception-side circuit B communicate the communication request signal and the communication request signal each other (performing handshake to perform the synchronous communication) is widely used in an on-chip bus and the like.

On the other hand, an asynchronous system is used in a communication in which the frequency ratio of each clock of two circuits that communicate with each other is neither one to an integer nor an integer to one, or the phases of the two clocks are not equal to each other. When communication is performed using the asynchronous system, the timing at which the signal is output and the timing at which the signal is received are in the asynchronous relation, and the signal may be fluctuated between "0" and "1" for a certain period of time. This phenomenon is called metastability, which causes malfunction of the circuit. In the asynchronous system, a synchronizing circuit is typically used in order to prevent malfunction caused by metastability (e.g., patent document 1).

In the technique disclosed in the patent document 1, a synchronizing circuit is provided between a first circuit that performs a predetermined operation in synchronization with a first clock signal and a second circuit that performs a predetermined operation in synchronization with a second clock signal. This synchronizing circuit latches the output data from the first circuit in synchronization with the first clock signal, and outputs the latched signal in synchronization with the second clock signal.

Further, other technique than the one stated above is suggested for preventing malfunction due to metastability (e.g., patent document 2). The technique disclosed in the patent document 2 detects the change of a data input signal and a clock input signal and performs control not to change the signal of the data input of the flip-flop when the set up or the hold time is not satisfied, so as to prevent malfunction due to metastability.

CITATION LIST

Patent Document 1
Japanese Unexamined Patent Application Publication No. 2003-273847
Patent Document 2
Japanese Unexamined Patent Application Publication No. 6-45880

SUMMARY OF INVENTION

Technical Problem

The problem in the synchronous system according to the related art is that the clock frequency ratio of each functional block that communicate with each other is limited to an integer ratio, more specifically one to an integer or an integer to one. This limitation can cause more serious problems with increasing number of functional blocks (circuits) that communicate with one another.

Further, in recent years, a dynamic frequency control system (DFS: Dynamic Frequency Scaling) that dynamically changes frequencies in operation for each functional block has been proposed for the purpose of reducing electric power consumption. However, when the clock frequency that can be set by each functional block is limited, the effect of lowering electric power in the DFS is suppressed.

On the other hand, the asynchronous system disclosed in the patent document 1 described above mainly has the following problems.

The first problem is nondeterministic operation. The operation in the level of a clock cycle becomes nondeterministic depending on the characteristic variations or the operational environment of the chip device. This results in an increase in the cost required for the test, verification and debug of hardware/software.

The second problem is large communication latency. The communication latency increases due to the delay required for the synchronization, which reduces the communication throughput. This results in degradation in performance, and an increase in a size and electric power in order to compensate the reduction in the communication throughput.

The third problem is that malfunction may be caused due to metastability, resulting in a decrease in reliability. This can be worse with an increase of the clock frequency, low voltage, and an increase in the positions subjected to synchronization. The time to cancel the metastability needs to be sufficiently secured in order to improve the reliability, which results in a further increase in the delay required for the synchronization and an increase in the communication latency.

Furthermore, the technique disclosed in the patent document 2 described above detects the changes of the data input signal and the clock input signal for operation to judge whether the set up or the hold time is satisfied. However, since the judgment criteria fluctuate depending on the characteristic variations or operational environment of the chip device, the operation in the level of the clock cycle becomes nondeterministic.

The present invention has been made in order to solve such problems, and aims to provide a highly reliable semiconductor device and a communication method in which communication can be performed between circuits with a large degree of freedom of clock frequency which can be set in each of the circuits, a decisive operation, and a small communication latency.

Solution to Problem

A first semiconductor device according to the present invention includes
a first circuit that performs processing based on a first clock signal, the first clock signal having a frequency M/N times as large as a frequency of a second clock signal (N is a positive integer, and M is a positive integer larger than N);
a second circuit that performs processing based on the second clock signal; and
a communication timing control circuit that generates a communication timing signal to control a timing at which the first circuit performs communication with the second circuit,
in which the communication timing control circuit generates a communication timing signal determined by a frequency ratio information and a phase relation information, the frequency ratio information setting a frequency ratio of the first clock signal to the second clock signal, the phase relation information indicating a phase relation between the first clock signal and the second clock signal.

A second semiconductor device according to the present invention includes a first circuit that performs processing based on a first clock signal, the first clock signal having a frequency M/N times as large as a frequency of a second clock signal (N is a positive integer, and M is a positive integer larger than N); a second circuit that performs processing based on the second clock signal; and a communication timing control circuit that generates a communication timing signal to control a timing at which the first circuit performs communication with the second circuit, in which the communication timing control circuit generates the communication timing signal so that the first circuit performs communication once for each communication performed by the second circuit.

A first communication method according to the present invention is a method that performs communication between a first circuit and a second circuit, the first circuit performing processing based on a first clock signal having a frequency M/N times as large as a frequency of a second clock signal (N is a positive integer, and M is a positive integer larger than N), the second circuit performing processing based on the second clock signal, the method including the steps of: generating a communication timing signal based on a frequency ratio information and a phase relation information, the frequency ratio information setting a frequency ratio of the first clock signal to the second clock signal, the phase relation information indicating a phase relation between the first clock signal and the second clock signal; and executing communication with the second circuit by the first circuit at a timing specified by the communication timing signal that is generated.

A second communication method according to the present invention is a method that performs communication between a first circuit and a second circuit, the first circuit performing processing based on a first clock signal having a frequency M/N times as large as a frequency of a second clock signal (N is a positive integer, and M is a positive integer larger than N), the second circuit performing processing based on the second clock signal, the method including the steps of: generating a communication timing signal so that the first circuit performs communication once for each communication performed by the second circuit; and executing communication with the second circuit by the first circuit at a timing specified by the communication timing signal that is generated.

Advantageous Effects of Invention

The present invention provides a highly reliable semiconductor device and a communication method in which communication can be performed between circuits with a large degree of freedom of clock frequency which can be set in each of the circuits, a decisive operation, and a small communication latency.

DESCRIPTION OF EMBODIMENTS

First Exemplary Embodiment of the Present Invention

Figure 1:
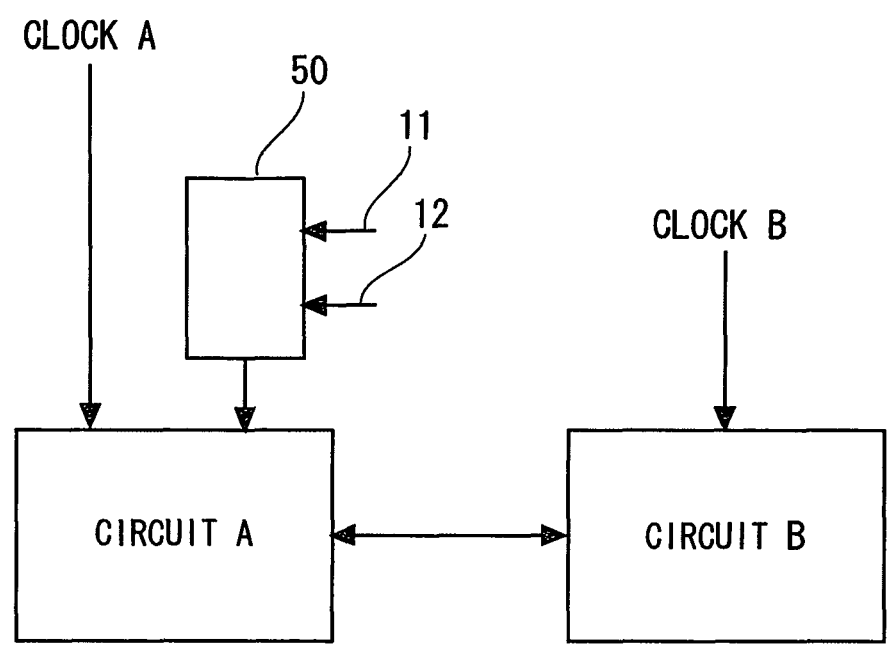
FIG. 1 is a configuration diagram of a semiconductor device according to the present invention.

First, with reference to FIG. 1, a basic communication method of a semiconductor device according to a first exemplary embodiment will be described. As shown in FIG. 1, the semiconductor device includes a circuit A operating with a clock A and a circuit B operating with a clock B. In this case, the clock A is a signal having a frequency M/N times as large as the frequency of the clock B (N is a positive integer, and M is a positive integer larger than N). This semiconductor device further includes a communication timing control circuit 50 that generates a communication timing signal to control the timing at which the circuit A communicates with the circuit B.

The communication timing control circuit 50 generates a communication timing signal determined by a frequency ratio information 11 that sets the ratio of the frequencies of the clock A and the clock B, and a phase relation information 12 indicating the phase relation between the clock A and the clock B. Preferably, the communication timing control circuit 50 generates the communication timing signal by referring to the frequency ratio information 11 and the phase relation information 12 so that the circuit A performs communication once for each communication performed by the circuit B.

Figure 2:
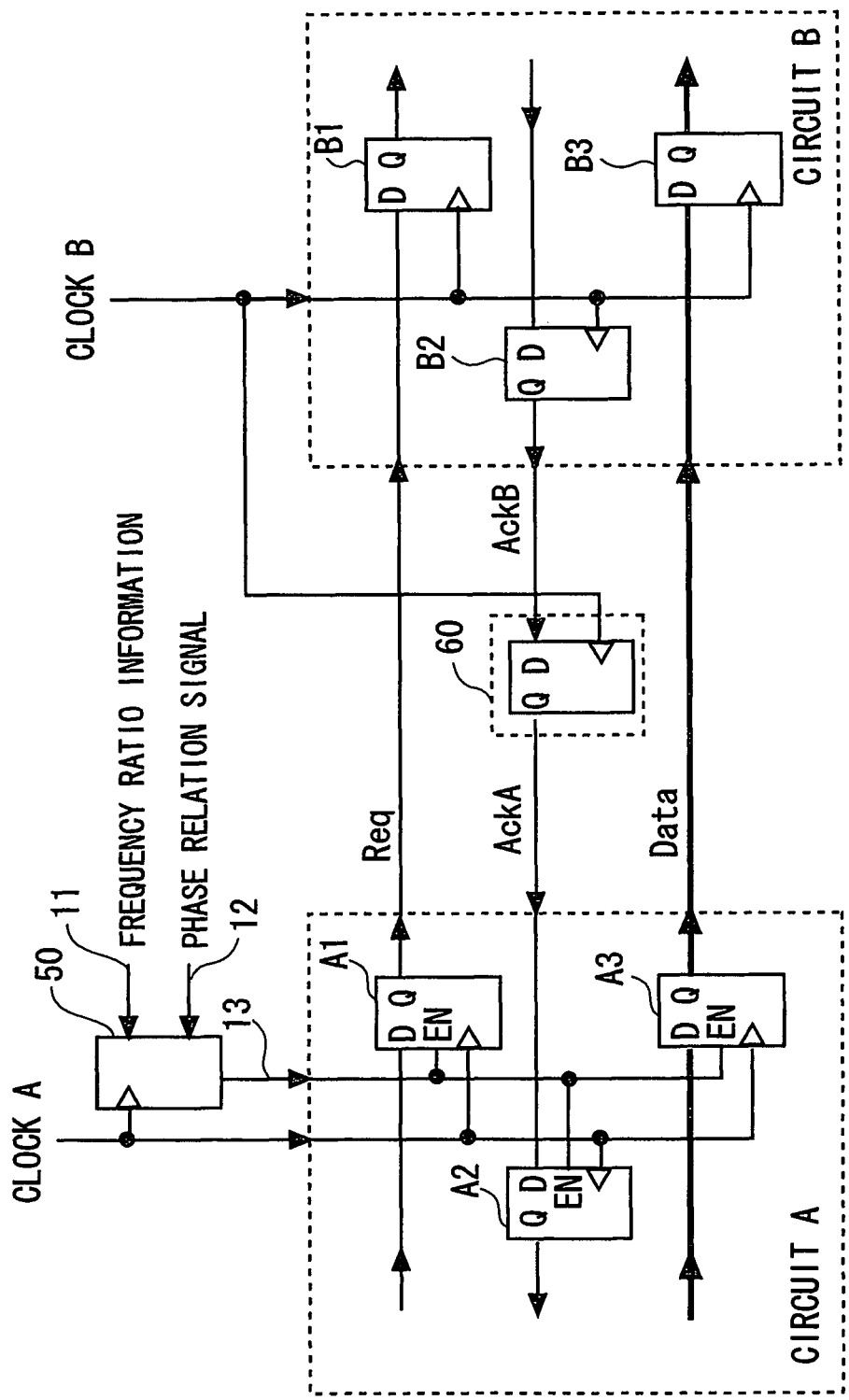
FIG. 2 is a configuration diagram of the semiconductor device according to the present invention.

Further, with reference to FIG. 2, a constitutional example of the semiconductor device according to the first exemplary embodiment will be described in detail. In the semiconductor device, the circuit A operating with the clock A and the circuit B operating with the clock B communicate data from the circuit A to the circuit B using a handshake-type synchronous communication system. The semiconductor device according to the present invention includes the communication timing control circuit 50 in place of a counter circuit 100 in a semiconductor device shown in FIG. 10, and further includes a hold time compensation circuit 60 on a path of a communication response signal Ack.

The circuit A includes flip-flops A1, A2, and A3 each having a clock input to which the clock A is input and an enable input (EN) to which a communication timing signal 13 output from the communication timing control circuit 50 is input. The flip-flop A1 outputs a communication request signal Req, the flip-flop A2 receives a communication response signal AckA, and the flip-flop A3 outputs a communication data signal Data.

The circuit B includes flip-flops B1, B2, and B3 each having a clock input to which the clock B is input. The flip-flop B1 receives the communication request signal Req, the flip-flop B2 outputs a communication response signal AckB, and the flip-flop B3 receives the communication data signal Data.

Figure 10:
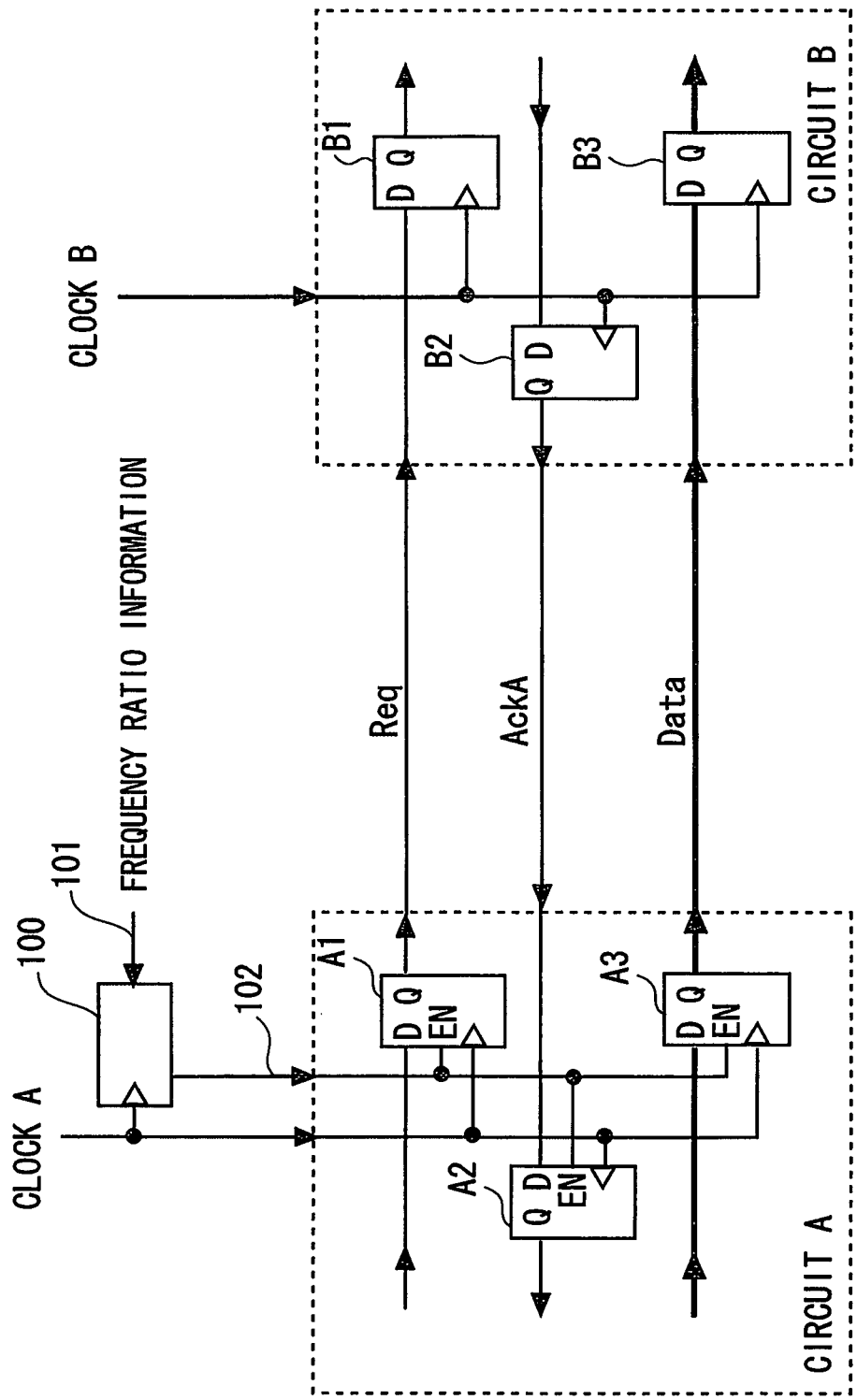
FIG. 10 is a configuration diagram of a semiconductor device according to a related art.

The frequency ratio of each clock of two circuits that communicate with other is limited to one to an integer or an integer to one in the example of the semiconductor device described with reference to FIG. 10, whereas the frequency ratio may be any integer ratio, or M to N (M and N are integers), e.g., 3:2, 2:5, according to the first exemplary embodiment. In this case as well, the synchronous communication can be performed.

In the first exemplary embodiment, the frequency of the clock A is any rational multiple of one or more of the clock B, or M/N times (M and N are positive integers, M≧N). In this case, the frequency ratio of the clock A to the clock B is M:N. The distribution delay of the clock A and that of the clock B are designed to be equal to each other by clock tree synthesis or the like. Further, the timings of the clock A and the clock B are designed to satisfy the set up and hold time constraints between adjacent communication timings as is similar to a typical synchronous circuit.

The communication timing control circuit 50 selects one timing at which the circuit A communicates for each communication timing of the circuit B by referring to the frequency ratio information 11 indicating the ratio of the frequencies of the clock A to the clock B and the phase relation signal 12 indicating the phase relation between the clock A and the clock B, and generates the communication timing signal 13 indicating the timing. The circuit A receives the communication timing signal 13, and performs communication only at the timing specified by the communication timing signal 13. On the other hand, the circuit B performs the communication operation for each cycle of the clock B. Thus, the communication speed of the circuit A coincides with that of the circuit B, so as to achieve the synchronous communication.

The hold time compensation circuit 60 is a circuit that is provided to achieve handshake-type synchronous communication even when the frequency ratio of the clock A to the clock B is any integer ratio represented as M:N (M and N are integers). The hold time compensation circuit 60 is composed of a flip-flop operating with the clock B, delays the signal AckB by one cycle of the clock B, and outputs the delayed signal as the signal AckA.

The circuit A and the circuit B communicate data from the circuit A to the circuit B by the communication request signal Req, the communication response signals AckB and AckA, and the communication data signal Data. The communication request signal Req is output by the circuit A at the timing of the clock A and received by the circuit B at the timing of the clock B when there is a communication request from the circuit A to the circuit B. The communication response signal AckB is output by the circuit B at the timing of the clock B when the circuit B is in a reception possible state, or the circuit B normally receives the communication data output from the circuit A. The communication response signal AckB is delayed by the hold time compensation circuit 60, and converted into the communication response signal AckA. The communication response signal AckA is received by the circuit A at the timing of the clock A. The communication data signal Data is a signal to transmit the communication data from the circuit A to the circuit B.

Figure 3:
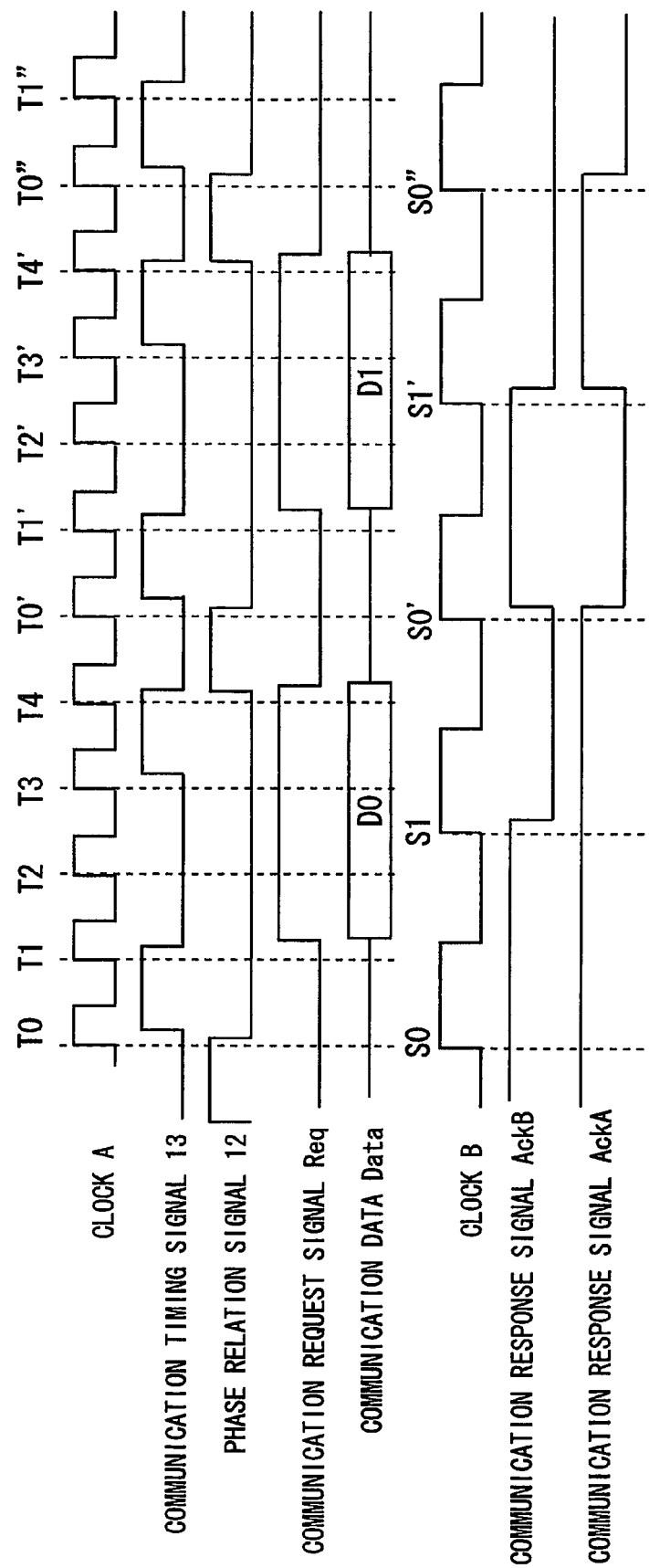
FIG. 3 is a timing chart showing an example of a communication operation of the semiconductor device according to the present invention.

FIG. 3 is a timing chart showing an operation in a case in which the circuit A transmits data to the circuit B when the frequency of the clock A is 5/2 times as large as the frequency of the clock B, which means the frequency ratio of the clock A to the clock B is 5:2. FIG. 3 shows the clock A, the communication timing signal 13, the phase relation signal 12, the communication request signal Req, the communication data signal Data, the clock B, the communication response signal AckB, and the communication response signal AckA.

Since the frequencies of the clock A and the clock B have an integer ratio of M:N and the distribution delay of the clock A and that of the clock B are equal to each other, the rising edges of the clock A and the clock B match at a certain cycle. More specifically, the phase relation of the clock A with respect to the clock B makes a round (rising edges match) for every M cycles, and the phase relation of the clock B with respect to the clock A makes a round (rising edges match) for every N cycles.

The frequency ratio of the clock A to the clock B is 5:2 in the example shown in FIG. 3, which means that the phase relation of the clock A with respect to the clock B makes a round for every five cycles, and the phase relation of the clock B with respect to the clock A makes a round for every two cycles. The timings of the clock A whose rising edge matches that of the clock B are denoted by T0, T0', T0", . . . , and five cycles in which the phase relation of the clock A with respect to the clock B makes a round are denoted by T0 to T4, and T0' to T4", . . . . Similarly, the timings of the clock B whose rising edge matches that of the clock A are denoted by S0, S0', S0", . . . , and two cycles in which the phase relation of the clock B with respect to the clock A makes a round are denoted by S0 to S1, and S0' to S1', . . . .

The communication timing signal 13 has the value of 1 at a timing at which the circuit A performs communication, and otherwise has the value of 0. More specifically, the communication timing signal 13 has the value 1 at timings T1, T4, T1', T4', T1", and otherwise the value 0. The flip-flops A1, A2, and A3 included in the circuit A each receive the communication timing signal 13 by the enable input (EN), so as to operate only at the timing at which the communication timing signal 13 has the value 1. Thus, the circuit A outputs the communication request signal Req and the communication data signal Data, and receives the communication response signal AckA at the timing at which this communication is performed.

The communication timing of the circuit A selected by the communication timing signal 13 may be any timing as long as one timing is selected for each communication timing of the circuit B. For example, T0 or T2 may be selected instead of T1 corresponding to timing S0. Similarly, T3 may be selected instead of T4 corresponding to timing S1. At any rate, the timings of the clock A and the clock B are required to be designed so as to satisfy the set up and hold time constraints between the clock A and the clock B as is similar to a typical synchronous circuit. Thus, the timing may be selected so as to facilitate timing design.

The phase relation signal 12 has the value of 1 at a timing at which the rising edge of the clock A matches that of the clock B (timings T0, T0', T0", . . . ), and otherwise has the value of 0, and provides a timing at which the phase relation of the clock A and the clock B makes a round. The phase relation signal 12 can be easily generated by the clock generation circuit that generates the clock A and the clock B. Otherwise, the phase relation signal 12 may be generated by a phase comparison circuit by comparing the phases of the clock A and the clock B.

Next, a specific communication operation will be described with reference to FIG. 3.

First, at S0 which is the communication timing by the circuit B, the circuit B is ready to receive communication, and outputs the value 1 as the communication response signal AckB.

Next, at T1 which is communication timing by the circuit A, the circuit A outputs the value 1 as the communication request signal Req so as to notify the circuit B that there is a communication request, and outputs data to be transmitted D0 as the communication data signal Data.

Next, at S1 which is communication timing by the circuit B, the circuit B receives the communication request output by the circuit A as the communication request signal Req at timing T1, and receives the communication data D0. As a result, the circuit B outputs the value 0 as the communication response signal AckB at timing S1 in order to notify the circuit A that the circuit B cannot receive further communication. At this timing, the hold time compensation circuit 60 receives the value 1 of the communication response signal AckB output by the circuit B at timing S0, and outputs the value 1 as the communication response signal AckA.

Next, at T4 which is communication timing by the circuit A, the circuit A receives the value 1 output by the circuit B as the communication response signal AckB at timing S0 and output by the hold time compensation circuit 60 as the communication response signal AckA at timing S1, so as to judge that the communication request and the data D0 are received. As a result, the circuit A outputs the value 0 as the communication request signal Req, and notifies the circuit B that there is no further communication request.

Next, at S0' which is communication timing by the circuit B, the circuit B is ready to receive communication again, and outputs the value 1 as the communication response signal AckB. At this timing, the hold time compensation circuit 60 receives the value 0 of the communication response signal AckB output by the circuit B at timing S1, and outputs the value 0 as the communication response signal AckA.

Next, at T1' which is communication timing by the circuit A, the circuit A again outputs the value 1 as the communication request signal Req so as to notify the circuit B that there is a communication request, and outputs data to be transmitted D1 as the communication data signal Data.

Next, at S1' which is communication timing by the circuit B, the circuit B receives the communication request output by the circuit A as the communication request signal Req at timing T1' and receives the communication data D1. As a result, the circuit B outputs the value 0 as the communication response signal AckB so as to notify the circuit A that the circuit B cannot receive further communication. At this timing, the hold time compensation circuit 60 receives the value 1 of the communication response signal AckB output by the circuit B at timing S0', and outputs the value 1 as the communication response signal AckA.

Next, at T4' which is communication timing by the circuit A, the circuit A receives the value 1 output by the circuit B as the communication response signal AckB at timing S0' and output by the hold time compensation circuit 60 as the communication response signal AckA at timing S1', and judges that the communication request and the data D1 are received. As a result, the circuit A outputs the value 0 to the communication request signal Req, and notifies the circuit B that there is no further communication request.

As described above, according to the semiconductor device of the first exemplary embodiment, the data communication can be performed from the circuit A to the circuit B using the handshake-type synchronous communication system even when the frequency ratio of the clock A to the clock B is any integer ratio.

Second Exemplary Embodiment of the Present Invention

Figure 4:
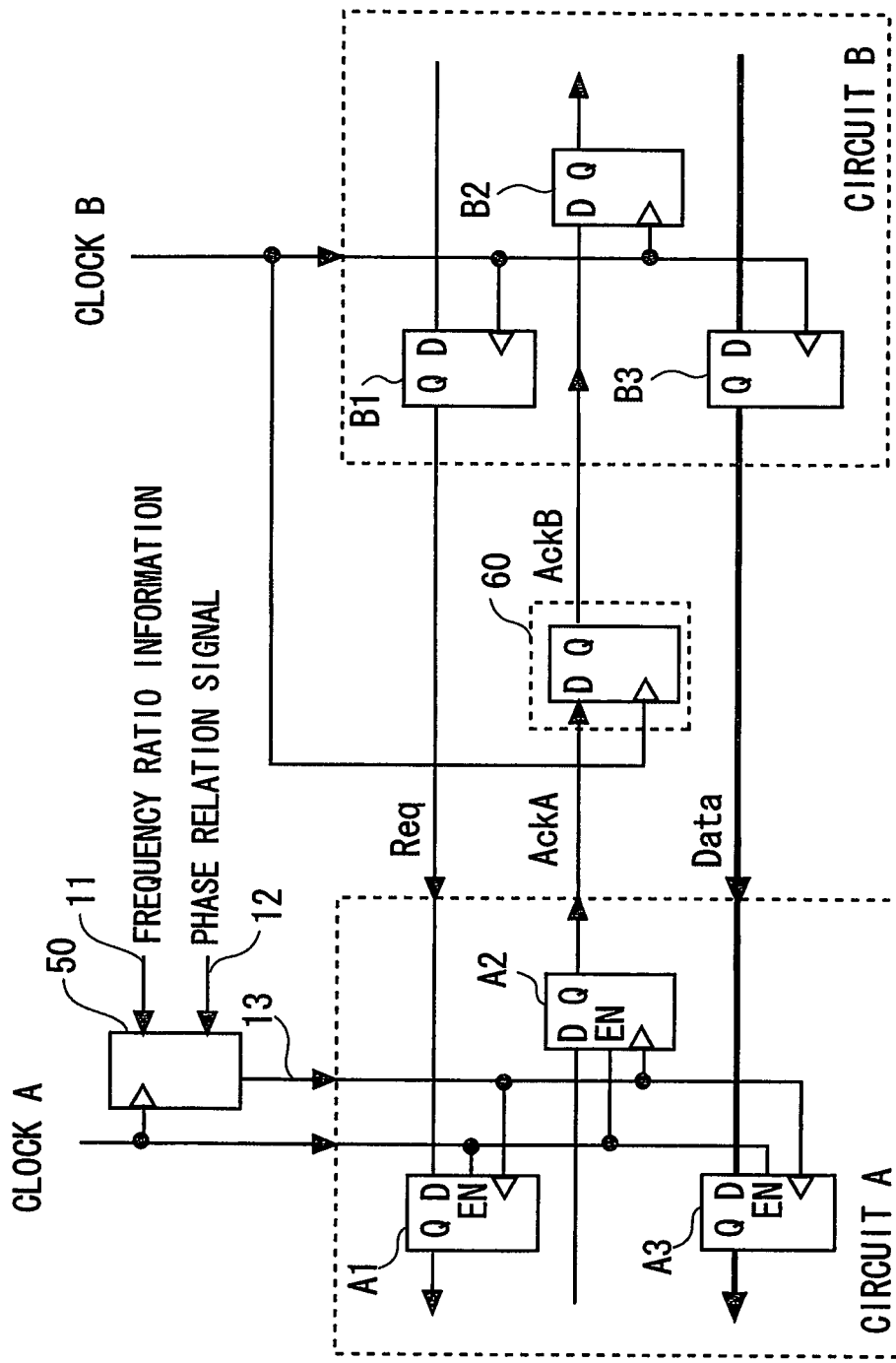
FIG. 4 is a configuration diagram of a semiconductor device according to the present invention.

A second exemplary embodiment is a constitutional example of a semiconductor device that communicates data from a circuit B to a circuit A. FIG. 4 shows an example of a semiconductor device in which the circuit B operating with a clock B communicates data to the circuit A operating with a clock A using a handshake-type synchronous communication system according to the second exemplary embodiment. In FIG. 4, the same components as those of the semiconductor device that communicates data from the circuit A to the circuit B shown in FIG. 2 are denoted by the same reference symbols, and detailed description will be omitted in the following description.

The circuit B transmits data to the circuit A using a communication request signal Req, communication response signals AckA and AckB, and a communication data signal Data. The communication request signal Req is output by the circuit B at the timing of the clock B when there is a communication request from the circuit B to the circuit A, and is received by the circuit A at the timing of the clock A. The communication response signal AckA is output by the circuit A at the timing of the clock A when the circuit A is in a reception possible state, or the circuit A normally receives communication data from the circuit B. The communication response signal AckA is delayed by a hold time compensation circuit 60, and is converted into the communication response signal AckB. The communication response signal AckB is received by the circuit B at the timing of the clock B. The communication data signal Data is a signal that transmits communication data from the circuit B to the circuit A.

Figure 5:
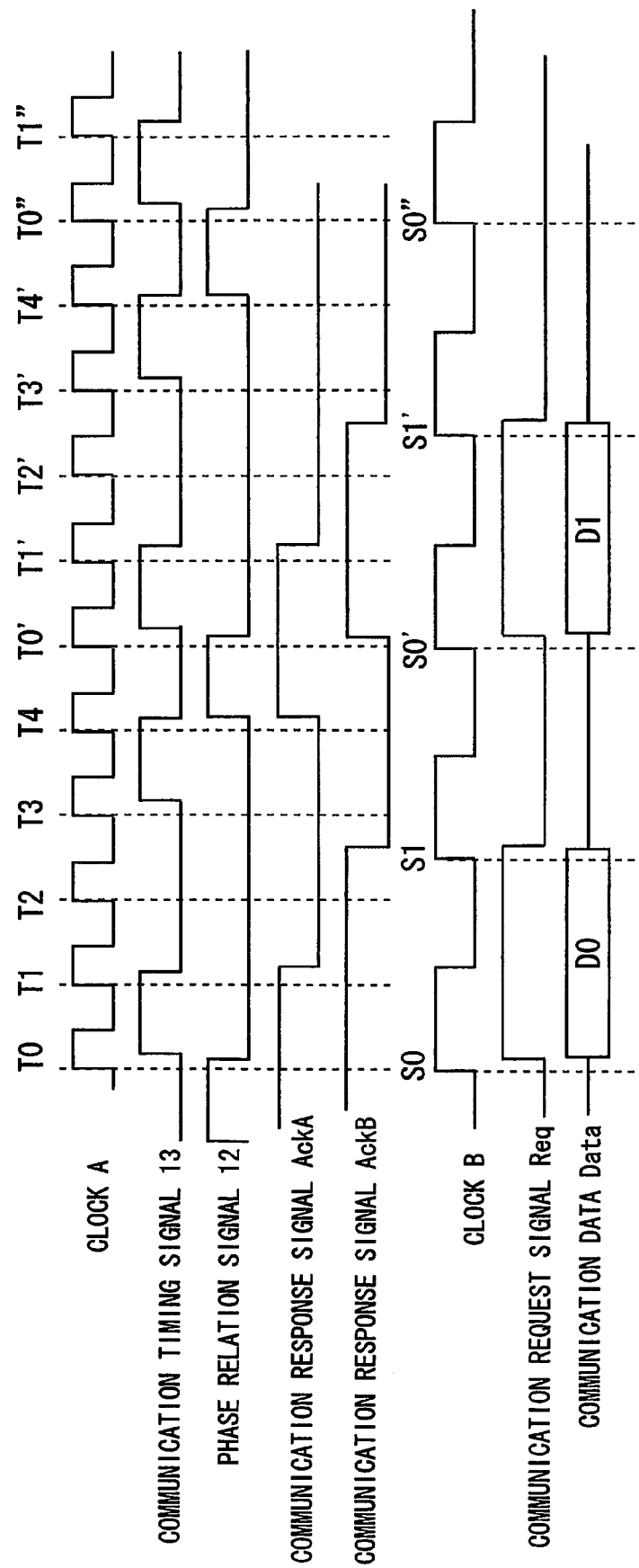
FIG. 5 is a timing chart showing an example of a communication operation of the semiconductor device according to the present invention.

FIG. 5 is a timing chart showing an operation in a case in which the circuit B transmits data to the circuit A when the frequency of the clock A is 5/2 times as large as the frequency of the clock B, and thus the frequency ratio of the clock A to the clock B is 5:2. FIG. 5 shows the clock A, the communication timing signal 13, the phase relation signal 12, the communication response signals AckB and AckA, the clock B, the communication request signal Req, and the communication data signal Data.

Referring to FIG. 5, a specific communication operation in the semiconductor device according to the second exemplary embodiment will be described.

First, at S0 which is communication timing by the circuit B, the circuit B outputs the value 1 as the communication request signal Req so as to notify the circuit A that there is a communication request, and outputs data to be transmitted D0 as the communication data signal Data. In this case, the hold time compensation circuit 60 receives the value 1 of the communication response signal AckA and outputs the value 1 as the communication response signal AckB.

Next, at T1 which is communication timing by the circuit A, the circuit A receives the communication request output by the circuit B as the communication request signal Req at timing S0 and receives the communication data D0. As a result, the circuit A outputs the value 0 as the communication response signal AckA in order to notify the circuit B that the circuit A cannot receive further communication.

Next, at S1 which is communication timing by the circuit B, the circuit B receives the value 1 output by the hold time compensation circuit 60 as the communication response signal AckB at timing S0, and judges that the communication request and the data D0 are received. As a result, the circuit B outputs the value 0 as the communication request signal Req, and notifies the circuit A that there is no further communication request. At this timing, the hold time compensation circuit 60 receives the value 0 of the communication response signal AckA at timing T1 and outputs the value 0 as the communication response signal AckB.

Next, at T4 which is communication timing by the circuit A, the circuit A is ready to receive communication again, and outputs the value 1 as the communication response signal AckA.

Next, at S0' which is communication timing by the circuit B, the circuit B again outputs the value 1 as the communication request signal Req so as to notify the circuit A that there is a communication request, and outputs data to be transmitted D1 as the communication data signal Data. At this timing, the hold time compensation circuit 60 receives the value 1 of the communication response signal AckA at timing T4 and outputs the value 1 as the communication response signal AckB.

Next, at T1, which is communication timing by the circuit A, the circuit A receives the communication request output by the circuit B as the communication request signal Req at timing S0', and receives the communication data D1. As a result, the circuit A outputs the value 0 as the communication response signal AckA in order to notify the circuit B that the circuit A cannot receive further communication.

Next, at S1' which is communication timing by the circuit B, the circuit B receives the value 1 output by the circuit A as the communication response signal AckA at timing T4 and output by the hold time compensation circuit 60 as the communication response signal AckB at timing S0', and judges that the communication request and the data D1 are received. As a result, the circuit B outputs the value 0 as the communication request signal Req, so as to notify the circuit A that there is no further communication request.

As described above, according to the semiconductor device of the second exemplary embodiment, the data communication can be performed from the circuit B to the circuit A similarly to the data communication from the circuit A to the circuit B using the handshake-type synchronous communication system even when the frequency ratio of the clock A to the clock B is any integer ratio.

Description Regarding Hold Time Compensation Circuit

The hold time compensation circuit 60 used in the first and the second exemplary embodiments of the present invention will be described.

In the handshake-type synchronous communication, handshake is performed using the communication request signal Req and the communication response signal Ack, so as to perform flow control of communication. It is assumed in the handshake-type synchronous communication according to the related art described with reference to FIG. 11 that two sets of communication timings are elapsed to complete the processing of (1) outputting the communication request to the signal Req by the transmission-side circuit, (2) receiving and referring to the communication request output to the signal Req and outputting the communication response to the signal Ack by the reception-side circuit, and (3) receiving the communication response output to the signal Ack by the transmission-side circuit. Hereinafter, the elapsed time from when the transmission-side circuit outputs the communication request to when it receives the communication response is referred to as a handshake latency.

Figure 11:
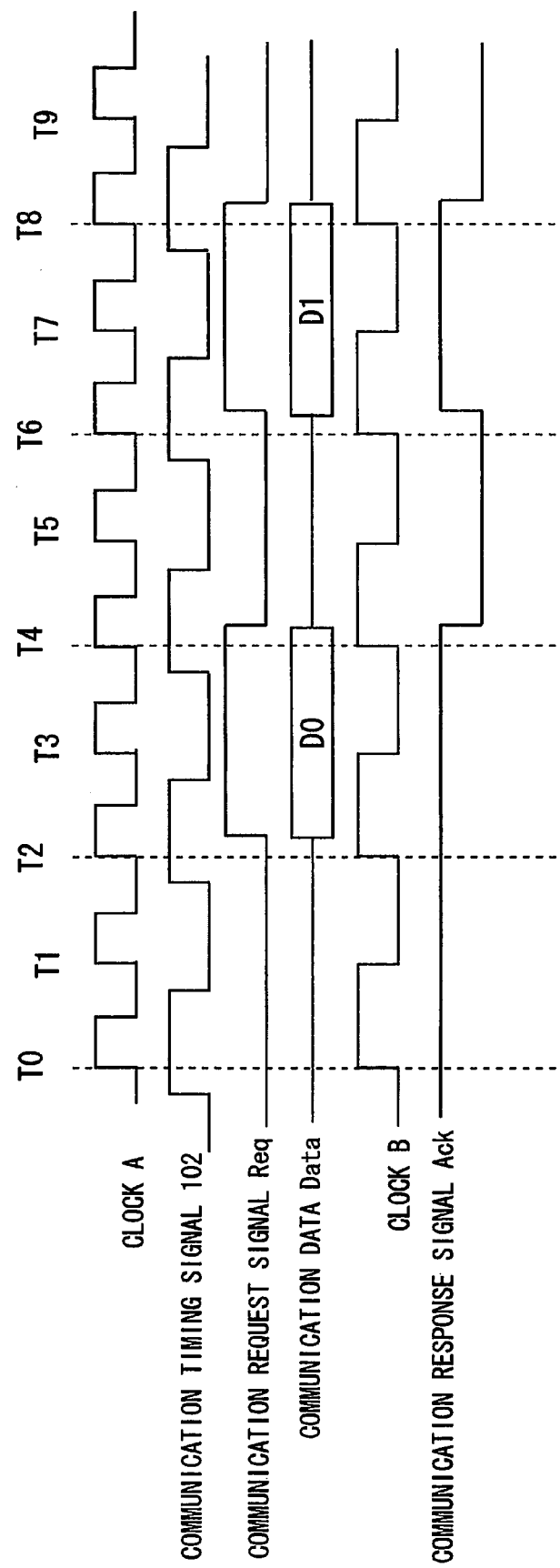
FIG. 11 is a timing chart showing an example of a communication operation of the semiconductor device according to the related art.

For example, in the communication operation described with reference to FIG. 11, (1) at timing T2, the transmission-side circuit A outputs the communication request as the signal Req, (2) at timing T4, the reception-side circuit B receives and refers to the communication request, and outputs the communication response as the signal Ack, and (3) at timing T6, the circuit A receives the communication response. In summary, the handshake latency from when the circuit A outputs the communication request to when the circuit A receives the communication response corresponds to two sets of the communication timings T2 to T6.

Similarly, in the communication operation according to the first exemplary embodiment described with reference to FIG. 3, (1) at timing T1, the circuit A outputs the communication request, (2) at timing S1, the circuit B receives the communication request, and outputs the communication response, and (3) at timing T1', the circuit A receives the communication response. In summary, the handshake latency corresponds to two sets of the communication timings T1 to T1'.

However, when communication is performed between clocks having the frequency ratio of any integer ratio, the timings of the rising edges of the clocks do not necessarily match. Hence, without the means such as the hold time compensation circuit 60, the handshake latency may correspond to a set of communication timings. In this case, the handshake operation is not normally performed, resulting in a failure of normal communication.

For example, when there is no hold time compensation circuit 60 in the communication operation according to the first exemplary embodiment described with reference to FIG. 3, (1) at timing T1, the circuit A outputs the communication request, (2) at timing S1, the circuit B receives the communication request, and outputs the communication response, and (3) at timing T4, the circuit A receives the communication response. Hence, the handshake latency corresponds to a set of communication timings T1 to T4. In this case, the handshake operation is not normally performed, which means normal communication cannot be performed.

The hold time compensation circuit 60 includes a function of executing compensation (hold time compensation) so as not to receive the output at each communication timing in the reception-side circuit at the communication timing immediately after the timing by the transmission-side circuit. For example, in the communication operation described with reference to FIG. 3, the hold time compensation circuit compensates for the hold time so that the circuit A receives the output from the circuit B at timing S1 not at timing T4 immediately after the timing S1 but at timing T1'.

As described above, when the handshake-type synchronous communication in which it is assumed that the handshake latency corresponds to two sets of the communication timings is achieved between clocks having a frequency ratio of any integer ratio, the hold time compensation circuit is required to be provided.

On the other hand, when communication flow control by the handshake operation is not performed such as a case in which data is unilaterally transmitted from the communication-side circuit to the reception-side circuit, the hold time compensation circuit 60 is not necessarily provided but may be omitted.

Further, when the communication is performed based on another handshake method in which it is assumed that one communication timing is elapsed from when the transmission-side circuit outputs the communication request to when it receives the communication response, the hold time compensation circuit 60 is not necessarily provided but may be omitted.

Figure 6:
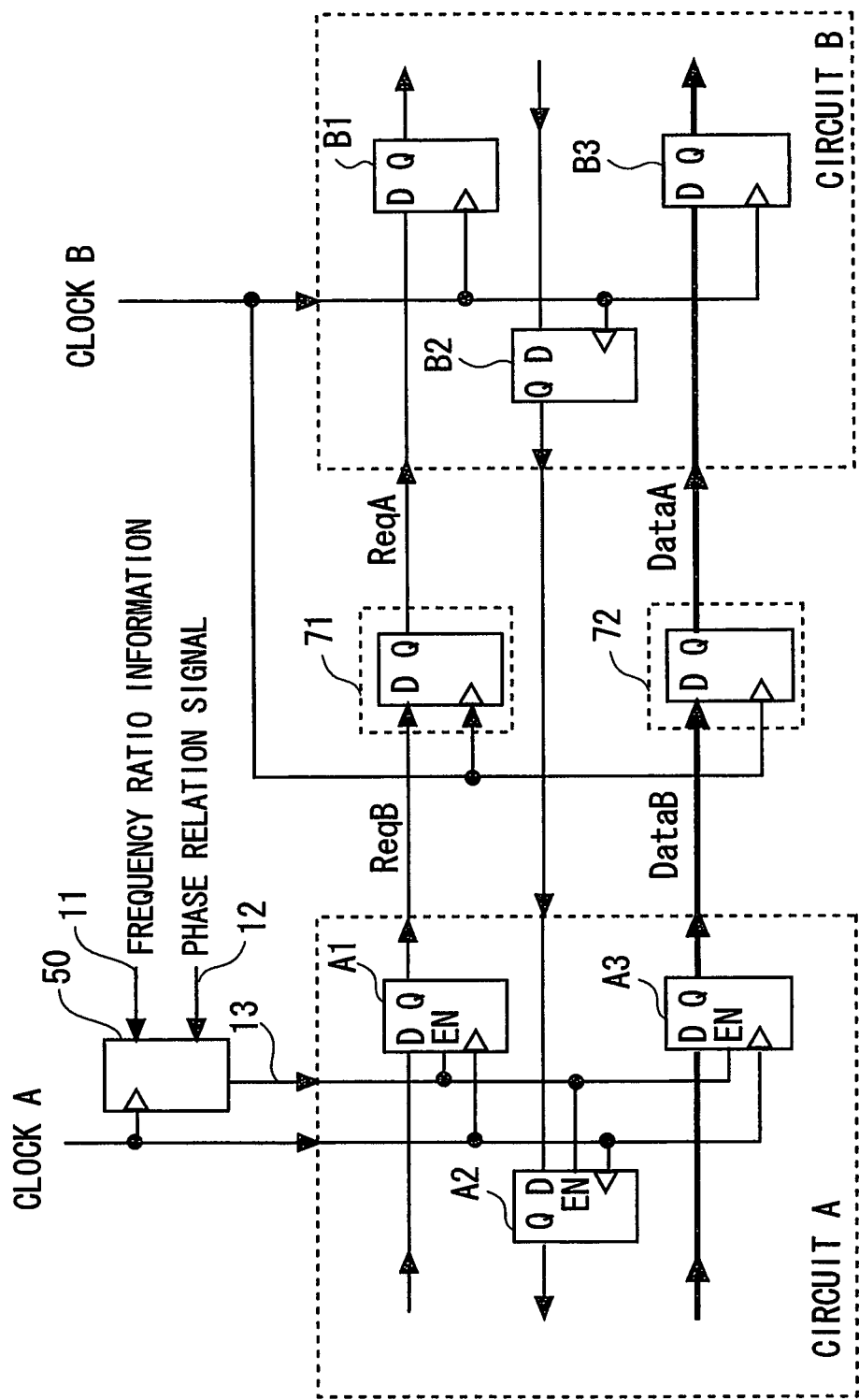
FIG. 6 is another configuration diagram of a semiconductor device according to the present invention.

Furthermore, although the hold time compensation circuit is arranged on the path of the communication response signal Ack in the second exemplary embodiment, it may be arranged on the communication request signal Req as shown in FIG. 6 so that the handshake latency corresponds to two sets of the communication timings. In this case, hold time compensation circuits 71 and 72 are arranged on the signal Data as well which is transmitted in the same direction as the signal Req so as to make the timing of the signal Req coincide with the timing of the signal Data. In this case, since the communication data signal Data is normally a signal having a multi-bit width, the size of the hold time compensation circuit that is required increases. Furthermore, the arrivals of the communication request and the communication data to the receiver circuit are delayed, which increases the communication latency.

On the other hand, since the signal Ack which is the communication response signal is normally a signal of one-bit width, the size of the hold time compensation circuit that is required is small, there is no problem that the communication latency increases according to the first and the second exemplary embodiments.

Figure 7:
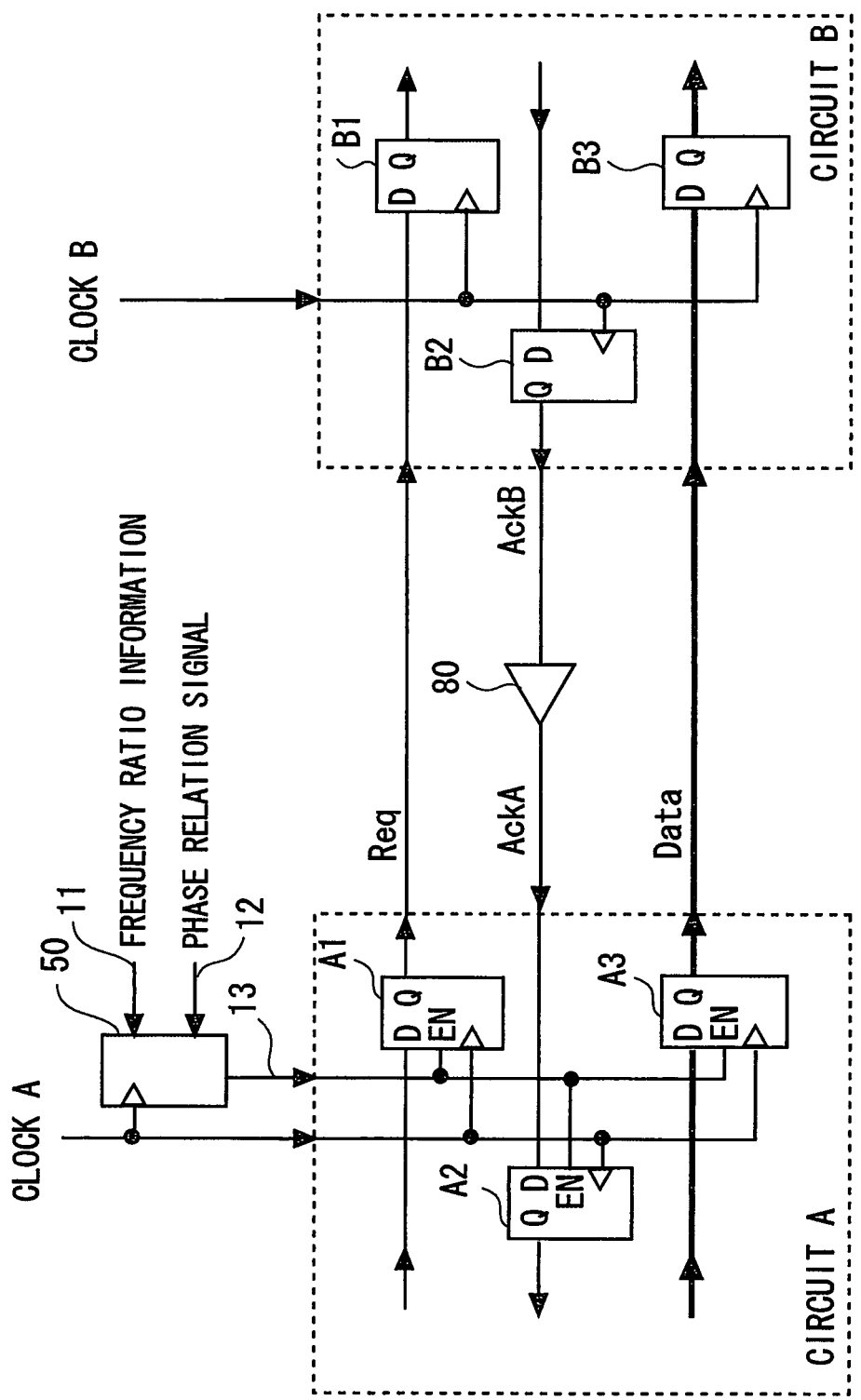
FIG. 7 is another configuration diagram of a semiconductor device according to the present invention.

Although the hold time compensation circuit 60 is constituted by a flip-flop driven with the clock B in the second exemplary embodiment, the hold time compensation circuit 60 may have other configuration as long as the handshake latency corresponds to two sets of the communication timings. For example, as shown in FIG. 7, a buffer circuit 80 may be inserted on the signal Ack, so as to perform hold time compensation so that the output at each communication timing of the reception-side circuit is not received by the transmission-side circuit at the communication timing immediately after the timing, to make the handshake latency correspond to two sets of the communication timings.

Description Regarding Communication Timing Control Circuit

The communication timing control circuit 50 used in the first and the second exemplary embodiments will be described with reference to the drawings.

Since the communication timing is periodic when the clock frequency ratio is one to an integer or an integer to one, the communication timing signal can be easily generated by a counter circuit. On the other hand, when the frequency ratio is any integer ratio, the communication timing varies in a complicated manner according to the frequency ratio. Thus, it is difficult to generate the communication timing signal 13 by the counter circuit.

Figure 8:
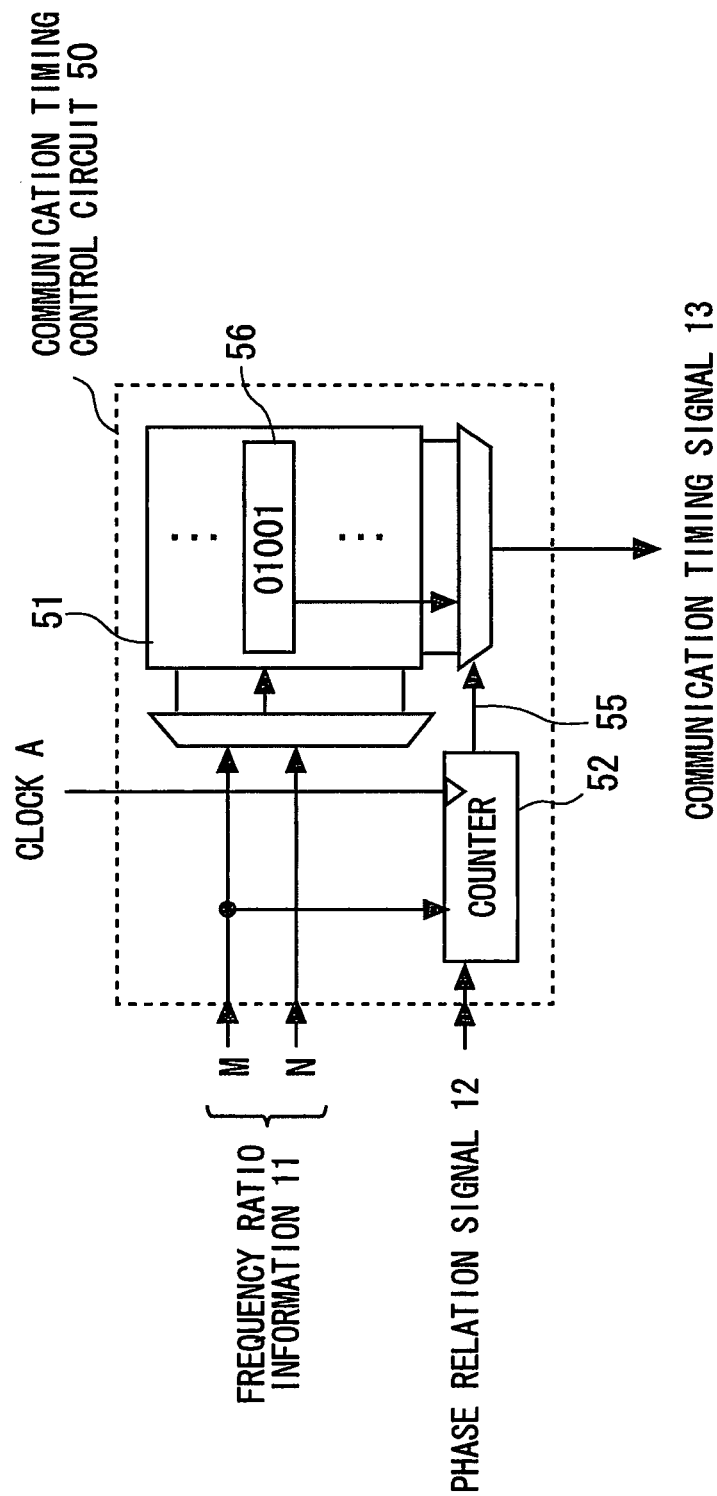
FIG. 8 is a configuration diagram of a communication timing control circuit according to the present invention.

FIG. 8 is a constitutional example of the communication timing control circuit 50. The communication timing control circuit 50 operates at the timing of the clock A, refers to the frequency ratio information 11 and the phase relation signal 12 to generate the communication timing signal 13 for each cycle of the clock A. The frequency ratio information 11 includes a signal M indicating the value of M and a signal N indicating the value of N of the frequency ratio M:N of the clock A to the clock B.

The communication timing control circuit 50 is composed of a table circuit 51 and a counter circuit 52. The counter circuit 52 operates at the timing of the clock A, refers to the signal M forming the frequency ratio information 11 to repeatedly count the number of cycles in which the phase relation between the clock A and the clock B makes a round, and outputs the value as a counter value 55.

The table circuit 51 includes a plurality of table data 56, and holds the value of the communication timing signal 13 in a table form for each frequency ratio and each relative phase relation between the clock A and the clock B. In this example, the frequency ratio is given by the frequency ratio information 11 composed of the signal M and the signal N. The relative phase relation between the clock A and the clock B is given by the counter value 55. In summary, the table circuit 51 refers to the input signal M, signal N, and the counter value 55, and outputs the communication timing signal 13 for each cycle of the clock A.

Figure 9:
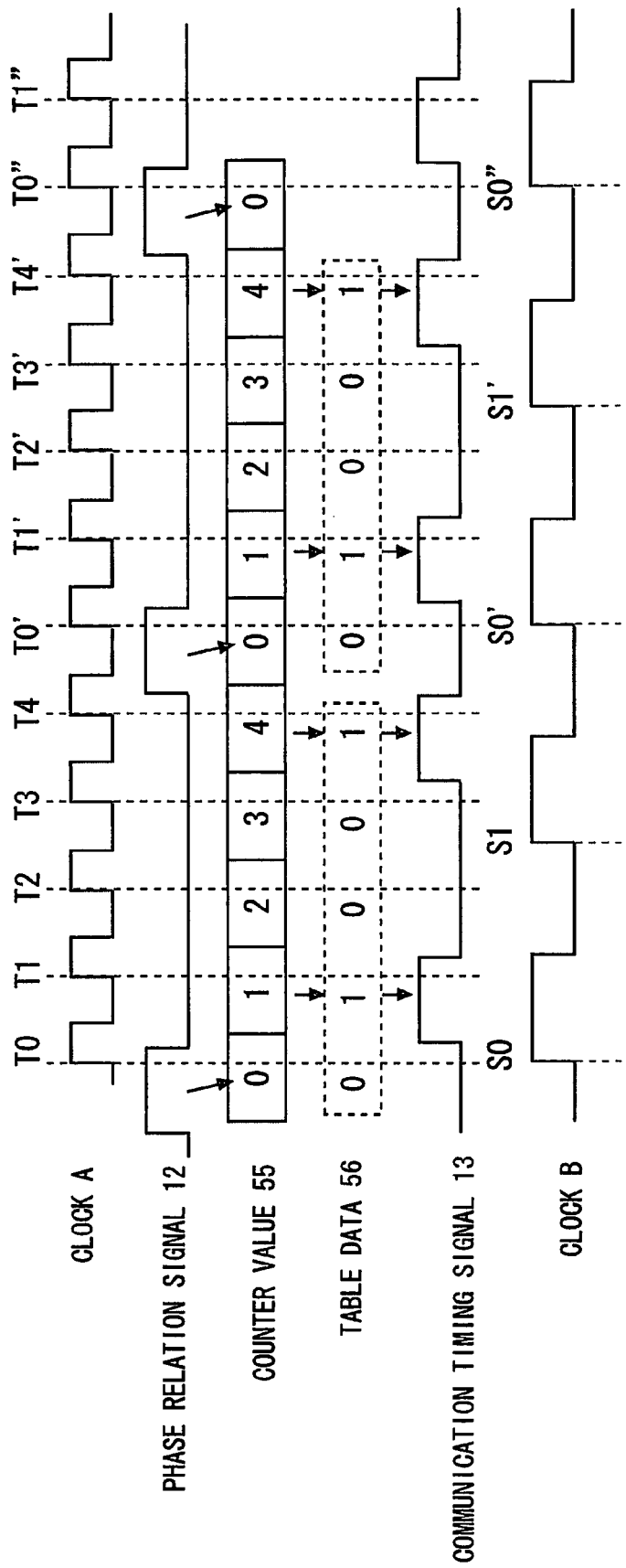
FIG. 9 is a timing chart showing an operation of the communication timing control circuit according to the present invention.

Referring next to FIG. 9, an operation of the communication timing control circuit 50 in this example will be described. FIG. 9 is a timing chart showing an operation of the communication timing control circuit 50 when the frequency ratio of the clock A to the clock B shown in FIG. 3 or 5 is 5:2. FIG. 9 shows the clock A, the phase relation signal 12, the counter value 55, values held in the table data 56, the communication timing signal 13, and the clock B.

The phase relation signal 12 is a signal having the value of 1 at the timing at which the rising edge of the clock A and that of the clock B match (T0, T0', T0", . . . ), and otherwise the value of 0. The phase relation signal 12 provides the timing at which the phase relation of the clock A and the clock B makes a round.

The counter circuit 52 has the value 0 at a timing at which the value of the phase relation signal 12 becomes 1, and thereafter repeatedly counts five cycles in which the phase relation of the clock A and the clock B makes a round. These values are shown from 0 to 4 as the counter value 55, which correspond to the timings T0 to T4, and T0' to T4', . . . . Specifically, the counter value 55 has the value 0 at timing T0, the value 1 at timing T1, the value 4 at timing T4, and again the value 0 at timing T0'. In summary, the counter circuit 52 outputs the relative phase relation between the clock A and the clock B as the counter value 55.

The table data 56 holds the value 1 when the cycle corresponds to the communication timing, and otherwise holds the value 0, and outputs the value as the communication timing signal 13. More specifically, the table data 56 outputs the value of 1 when the counter value 55 is 1 and 4, and otherwise outputs the value of 0 as the communication timing signal 13.

Although FIG. 9 shows an operation example in a case in which the frequency ratio of the clock A to the clock B is 5:2, the value of the table data 56 may be set as appropriate in other cases for each frequency ratio and each relative phase relation between the clock A and the clock B, whereby the communication timing signal 13 may be properly generated even when the frequency ratio is any integer ratio. More specifically, the value of the table data 56 may be set so as to select one communication timing of the circuit (circuit A) that refers to the communication timing signal for each communication timing of the circuit (circuit B) with which the circuit A communicates.

The values of the signal M and the signal N that constitute the frequency ratio information 11 are constant in the example shown in FIG. 9. However, they may be changed as appropriate during the operation as long as the table circuit 51 holds the table data 56 corresponding to these values.

Although the frequency ratio information 11 is composed of the signal M and the signal N in this example, it may have another form as long as it can set the frequency ratio of the clock A to the clock B.

As described above, the semiconductor device according to the first and the second exemplary embodiments is capable of freely setting the clock frequency of each core within a range that is presumed when designing, and synchronous communication is performed by the clock, thereby providing a highly reliable communication between circuits (functional blocks) with a decisive operation and a small communication latency. Further, accordingly, it is possible to prevent metastability problem which causes a problem in an asynchronous system and achieve the communication between circuits (functional blocks) with a decisive operation in a cycle level, small latency, and low throughput.

Other Exemplary Embodiment

Although the communication timing control circuit according to the first and the second exemplary embodiments of the present invention generates the communication timing signal so that the circuit A performs communication once for each communication performed by the circuit B by referring to the frequency ratio information for setting the frequency ratio of the clock A to the clock B and the phase relation information indicating the phase relation between the clock A and the clock B. However, it is not limited to this example. For example, the communication timing signal may be any one as long as it is determined by the frequency ratio information and the phase relation information. The frequency ratio information and the phase relation information may not be input to the communication timing control circuit as the information. Furthermore, the communication timing signal may not be necessarily determined by the frequency ratio information and the phase relation information. The effect of the present invention can be attained as long as the circuit A performs communication for each communication performed by the circuit B.

Although the present invention has been described with reference to the exemplary embodiments, the present invention is not limited by the exemplary embodiments described above. Various changes that can be understood by a person skilled in the art may be made on the configuration and details of the present invention within the scope of the present invention.

This application claims the benefit of priority, and incorporates herein by reference in its entirety, the following Japanese Patent Application No. 2008-190081 filed on Jul. 23, 2008.

INDUSTRIAL APPLICABILITY

The present invention is applicable to a semiconductor device and a communication method, and more particularly, to a communication technique between a plurality of circuits operating with different clock frequencies.

REFERENCE SIGNS LIST

11 FREQUENCY RATIO INFORMATION
12 PHASE RELATION SIGNAL
13 COMMUNICATION TIMING SIGNAL
50 COMMUNICATION TIMING CONTROL CIRCUIT
51 TABLE CIRCUIT
52 COUNTER CIRCUIT
55 COUNTER VALUE
56 TABLE DATA
60 HOLD TIME COMPENSATION CIRCUIT
100 COUNTER CIRCUIT
101 FREQUENCY RATIO INFORMATION
102 COMMUNICATION TIMING SIGNAL

The invention claimed is:

1. A semiconductor device comprising:
a first circuit that performs processing based on a first clock signal, the first clock signal having a frequency M/N times as large as a frequency of a second clock signal (N is a positive integer, and M is a positive integer larger than N);
a second circuit that performs processing based on the second clock signal;
a communication timing control circuit that generates a communication timing signal to control a communication timing between the first circuit and the second circuit based on a frequency ratio information and a phase relation information, the frequency ratio information setting a frequency ratio of the first clock signal to the second clock signal, the phase relation information indicating a phase relation between the first clock signal and the second clock signal; and
a hold time compensation circuit that adds a delay to a communication request signal and a communication data signal, or to a communication response signal, the communication request signal being transmitted by a data transmission-side circuit which comprises one of the first circuit and the second circuit when the data transmission-side circuit requests communication from a data reception-side circuit which comprises the other of the first circuit and the second circuit, the communication data signal being the signal transferring communication data from the data-transmission side circuit to the data reception-side circuit, the communication response signal being transmitted by the data reception-side circuit to the data transmission-side circuit when the data reception-side circuit receives the communication request signal,
wherein the communication timing control circuit refers to the frequency ratio information for setting the frequency ratio of the first clock signal to the second clock signal and the phase relation information indicating the phase relation between the first clock signal and the second clock signal, so as to generate the communication timing signal so that the first circuit performs communication once for each communication performed by the second circuit.

2. The semiconductor device according to claim 1, wherein the hold time compensation circuit adds a delay to the communication response signal so that the data transmission-side circuit does not receive the communication response signal at a communication timing immediately after a timing at which the communication response signal is transmitted.

3. The semiconductor device according to claim 1, wherein the hold time compensation circuit comprises a flip-flop circuit that is driven with the second clock signal.

4. The semiconductor device according to claim 1, wherein the communication timing control circuit repeatedly counts up to the positive integer M at a timing of the first clock signal, generates a count value indicating a relative phase between the first clock signal and the second clock signal, and generates the communication timing signal based on the count value.

5. The semiconductor device according to claim 4, wherein the communication timing control circuit holds data indicating if it is a timing to perform communication in a table circuit in advance at least for each combination of the frequency ratio information and the count value, and outputs the data output from the table circuit as the communication timing signal according to the combination that is input.

6. The semiconductor device according to claim 2, wherein the hold time compensation circuit comprises a flip-flop circuit that is driven with the second clock signal.

7. The semiconductor device according to claim 2, wherein the communication timing control circuit repeatedly counts up to the positive integer M at a timing of the first clock signal, generates a count value indicating a relative phase between the first clock signal and the second clock signal, and generates the communication timing signal based on the count value.

8. The semiconductor device according to claim 3, wherein the communication timing control circuit repeatedly counts up to the positive integer M at a timing of the first clock signal, generates a count value indicating a relative phase between the first clock signal and the second clock signal, and generates the communication timing signal based on the count value.

9. A communication method that performs communication between a first circuit and a second circuit, the first circuit performing processing based on a first clock signal having a frequency M/N times as large as a frequency of a second clock signal (N is a positive integer, and M is a positive integer larger than N), the second circuit performing processing based on the second clock signal, the method comprising:

generating a communication timing signal based on a frequency ratio information and a phase relation information, the frequency ratio information setting a frequency ratio of the first clock signal to the second clock signal, the phase relation information indicating a phase relation between the first clock signal and the second clock signal;

executing communication between the first circuit and the second circuit at a timing specified by the communication timing signal that is generated; and adding a delay to a communication request signal and a communication data signal, or to a communication response signal, the communication request signal being transmitted by a data transmission-side circuit which comprises one of the first circuit and the second circuit when the data transmission-side circuit requests communication from a data reception-side circuit which comprises the other of the first circuit and the second circuit, the communication data signal being the signal transferring communication data from the data-transmission side circuit to the data reception-side circuit, the communication response signal being transmitted by the data reception-side circuit to the data transmission-side circuit when the data reception-side circuit receives the communication request signal, wherein the generating the communication timing signal comprises referring to the frequency ratio information for setting the frequency ratio of the first clock signal to the second clock signal and the phase relation information indicating the phase relation between the first clock signal and the second clock signal, so as to generate the communication timing signal so that the first circuit performs communication once for each communication performed by the second circuit when generating the communication timing.

10. The communication method according to claim 9, further comprising adding a delay to the communication response signal so that the data transmission-side circuit does not receive the communication response signal at a communication timing immediately after a timing at which the communication response signal is transmitted.

11. The communication method according to claim 9, further comprising repeatedly counting up to the positive integer M at a timing of the first clock signal, generating a count value indicating a relative phase between the first clock signal and the second clock signal, and generating the communication timing signal based on the count value.

12. The communication method according to claim 10, further comprising repeatedly counting up to the positive integer M at a timing of the first clock signal, generating a count value indicating a relative phase between the first clock signal and the second clock signal, and generating the communication timing signal based on the count value.

* * * * *